United States Patent
Fallon

(10) Patent No.: US 6,315,270 B1
(45) Date of Patent: Nov. 13, 2001

(54) CABLE PULLEY

(75) Inventor: Michael Fallon, Westlake, OH (US)

(73) Assignee: Marconi Communications, Inc., Cleveland, OH (US)

( * ) Notice: Subject to any disclaimer, the term of this patent is extended or adjusted under 35 U.S.C. 154(b) by 0 days.

(21) Appl. No.: 09/620,519

(22) Filed: Jul. 20, 2000

Related U.S. Application Data

(60) Provisional application No. 60/145,058, filed on Jul. 22, 1999.

(51) Int. Cl.[7] ................................................. B65H 59/00
(52) U.S. Cl. ................................................. 254/134.3 PA
(58) Field of Search .................. 254/134.3 PA, 254/134.3 FT, 134.34 R, 134.5

(56) References Cited

U.S. PATENT DOCUMENTS

| | | |
|---|---|---|
| 2,641,428 | 6/1953 | Kirk et al. . |
| 2,816,734 | 12/1957 | Crofoot . |
| 3,687,406 | 8/1972 | Krahe et al. . |
| 3,687,407 | 8/1972 | Dickerson . |
| 3,740,048 | 6/1973 | Lassy et al. . |
| 3,863,897 * | 2/1975 | Yeager ........................... 254/134.3 R |
| 4,690,381 * | 9/1987 | Asai ............................... 254/134.3 R |
| 5,064,172 * | 11/1991 | Hereford ........................... 254/134.3 |
| 5,533,710 * | 7/1996 | Sauber ........................ 254/134.3 PA |
| 5,868,538 | 2/1999 | Rathbun . |
| 6,129,340 * | 10/2000 | Daniel ........................ 254/134.3 PA |

FOREIGN PATENT DOCUMENTS 830717    2/1952   (DE) .

* cited by examiner

*Primary Examiner*—Joseph J. Hail, III
*Assistant Examiner*—Lee Wilson

(57) ABSTRACT

A pulley guides a cable on an overhead framework structure which is suspended from a ceiling by a threaded rod. The pulley includes a guide structure which guides the cable longitudinally through the pulley, and further includes a bracket structure which mounts the guide structure on the threaded rod. The guide structure can be mounted on the threaded rod in a first position in which a cable can be moved transversely into and out of the guide structure, and can be alternatively mounted on the threaded rod in a second position in which the cable cannot be moved transversely into or out of the guide structure.

15 Claims, 5 Drawing Sheets

CABLE PULLEY

This application claims benefit of Provisional application No. 60/145,058, filed Jul. 22, 1999.

FIELD OF THE INVENTION

The present invention relates to a pulley for installing cables at a central office in a telephone system.

BACKGROUND OF THE INVENTION

A central office in a telephone system contains banks of batteries for powering the equipment in the central office upon a failure of the external power supply. Power cables for interconnecting the batteries and the telephone equipment are supported on overhead racks. The racks are ladder shaped structures that extend horizontally across beams defined by framing channels. The framing channels are suspended from the ceiling by threaded rods that are anchored to the ceiling.

Pulleys are used to guide the power cables over the racks when the power cables are being installed. Specifically, the pulleys are clamped onto the racks or the framing channels at locations suitable for the particular installation of power cables. The pulleys are removed when the installation is complete.

SUMMARY OF THE INVENTION

The present invention comprises a pulley apparatus, and particularly comprises a pulley apparatus for installing a cable on an overhead framework structure at a central office in a telephone system. The pulley is configured to be mounted on a threaded rod upon which the overhead framework structure is suspended from the ceiling of the central office.

Specifically, the pulley apparatus includes a guide structure which guides the cable longitudinally through the pulley, and further includes a bracket structure which mounts the guide structure on the threaded rod. In a preferred embodiment, the guide structure can be mounted on the threaded rod in a first position in which a cable can be moved transversely into and out of the guide structure, and can be alternatively mounted on the threaded rod in a second position in which the cable cannot be moved transversely into or out of the guide structure.

DESCRIPTION OF PREFERRED EMBODIMENTS

Figure 1:
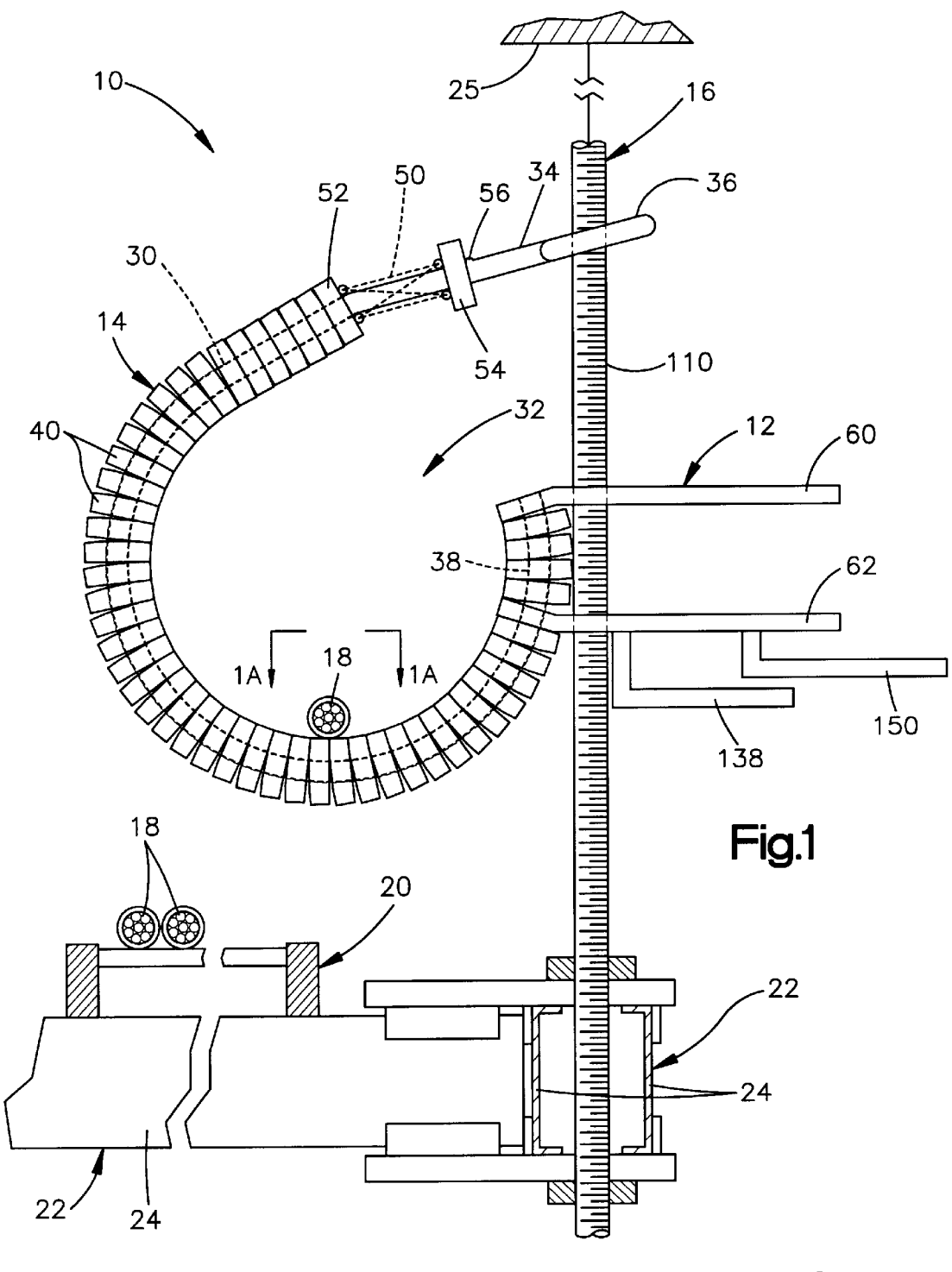
FIG. 1 is a side view of an apparatus comprising a first embodiment of the invention.

A pulley 10 comprising a first embodiment of the invention is shown in FIG. 1. The pulley 10 includes a bracket structure 12 and a guide structure 14. The bracket structure 12 is configured for mounting on a threaded rod 16. The guide structure 14 is configured to guide one or more cables 18 longitudinally through the pulley 10.

The cables 18 shown in FIG. 1 are power cables that interconnect batteries and telephone equipment, and are supported on an overhead rack 20. The rack 20 is a ladder shaped structure that extends horizontally across beams 22 defined by framing channels 24. The horizontal beams 22 defined by the framing channels 24 are suspended from the ceiling 25 by vertical threaded rods 16 (one of which is shown in FIG. 1) that are anchored to the ceiling 25.

Figure 1A:
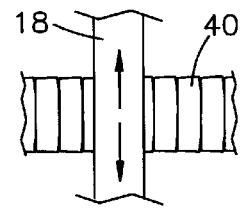
FIG. 1A is a view taken on line 1A—1A of FIG. 1.

The guide structure 14 includes a pulley rod 30 in the shape of an open loop 32. An upper end portion 34 of the pulley rod 30 includes a hook 36 that extends around the threaded rod 16 when the pulley 10 is mounted on the threaded rod 16 in the position shown in FIG. 1. The bracket structure 12 projects from the opposite end portion 38 of the pulley rod 30. A plurality of rollers 40 are received over the pulley rod 30. The rollers 40 are rotatable on the pulley rod 30 under the influence of a cable 18 when the cable 18 is pulled longitudinally through the loop 32 defined by the pulley rod 30, i.e., when the cable 18 is pulled in the longitudinal directions indicated by the arrows shown in FIG. 1A.

Figure 2:
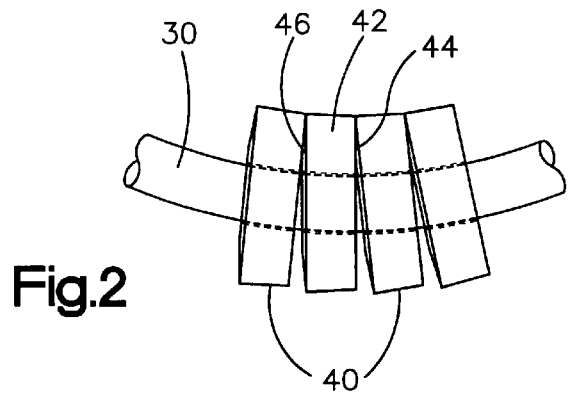
FIG. 2 is an enlarged partial view of parts shown in FIG. 1.

Each roller 40 in the first embodiment of the invention is an independently rotatable disk with a cylindrical peripheral surface 42 (FIG. 2), a flat side surface 44, and a frusto-conical side surface 46. Each frusto-conical side surface 46 faces and adjoins the flat side surface 44 of an adjacent roller 40. This promotes rolling contact between adjacent rollers 40 over a surface area that is wider than an area that might otherwise be defined by line contact between adjacent rollers 40.

The rollers 40 in the first embodiment are pressed together under the bias of a spring 50. The spring 50 is compressed between a pair of washers 52 and 54 that are movable along the pulley rod 30. Movement of one washer 52 is limited by the rollers 40 when the rollers 40 are pressed into contact with one another under the influence of the spring 50. Movement of the other washer 54 is limited by a stop member 56 on the pulley rod 30. That washer 54 can be moved away from the hook 36 against the bias of the spring 50 to provide clearance as needed for removal of the hook 36 from the threaded rod 16 upon which the pulley 10 is mounted.

The bracket structure 12 in the first embodiment includes a pair of bracket bars 60 and 62 which are vertically spaced apart from each other. Each bracket bar 60 and 62 has a rectangular cross section. The upper bracket bar 60 is shown separately in FIG. 3, and the lower bracket bar 62 is shown separately in FIG. 4. The upper bracket bar 60 has a pair of transversely extending slots 64 and 66 which are open at its opposite side edges 68 and 70. The first slot 64 is located directly beneath the hook 36 (FIG. 1) at the upper end portion 34 of the pulley rod 30. The second slot 66 is spaced horizontally from the hook 36. The threaded rod 16 hanging from the ceiling can fit into either slot 64 or 66.

Figure 4:
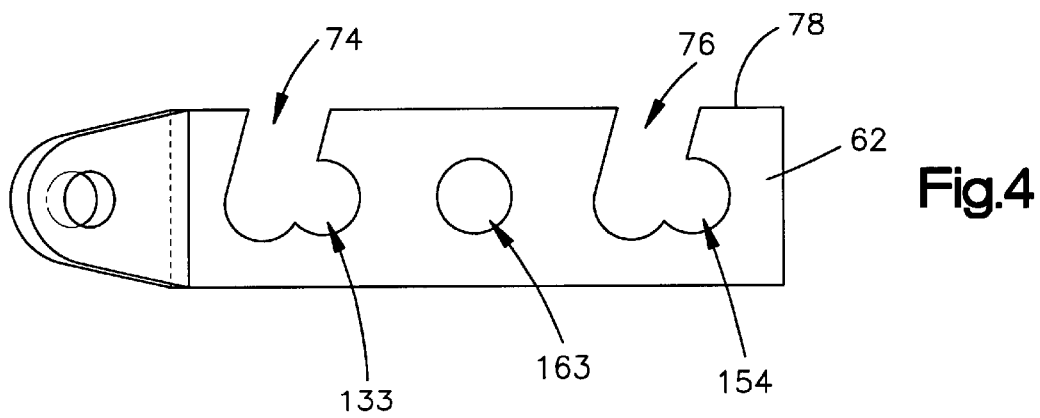
FIG. 4 is an enlarged top view of another part shown in FIG. 1.

As shown in FIG. 4, the lower bracket bar 62 also has a pair of slots 74 and 76 for separately receiving the threaded rod 16. However, the slots 74 and 76 in the lower bracket bar 62 are open at the same side edge 78 of the lower bracket bar 62.

Figure 6:
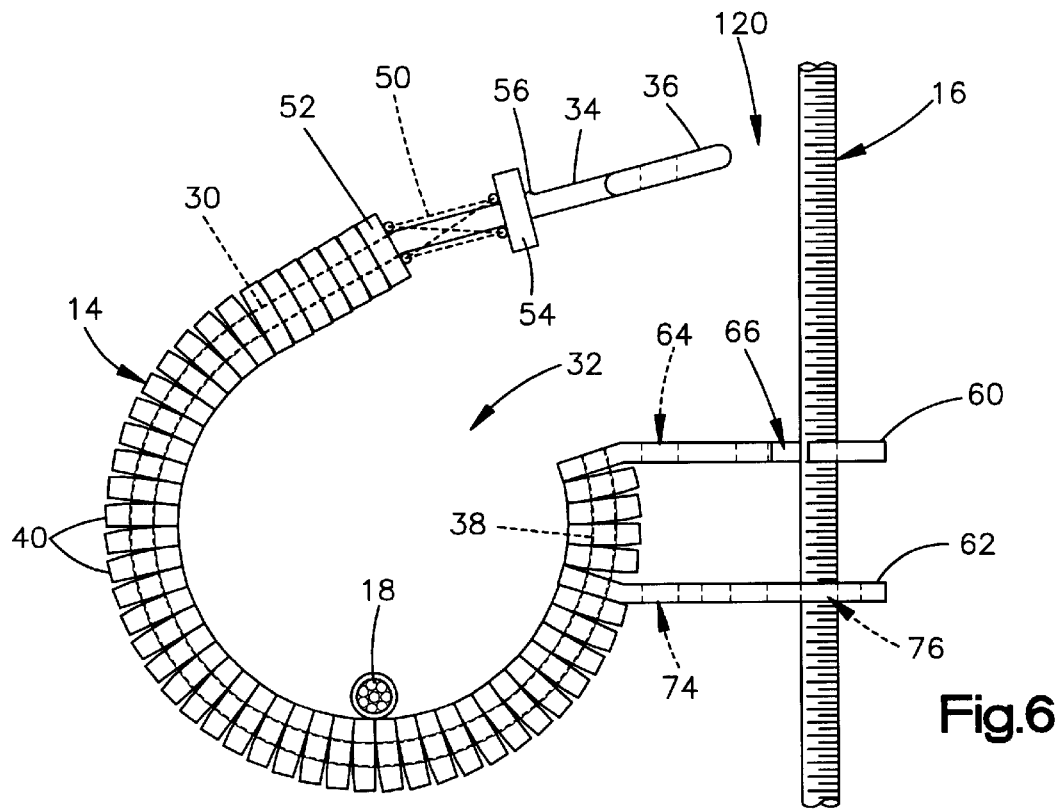
FIG. 6 is a view similar to FIG. 5 showing parts in different positions.
Figure 7:
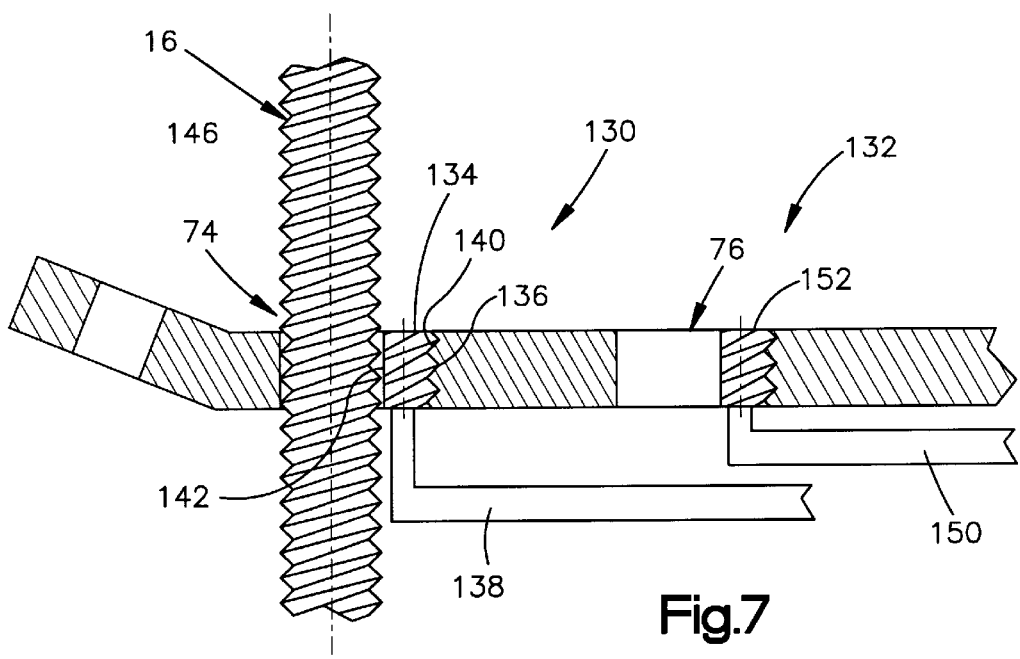
FIG. 7 is an enlarged sectional view of other parts shown in FIG. 1.

The pulley 10 can be mounted on the threaded rod 16 in a either a closed position, as shown in FIG. 6, or in an open position, as shown in FIG. 7. In the closed position the threaded rod 16 extends through the hook 36 at the upper end portion 34 of the pulley rod 30, through the first slot 64 in the upper bracket bar 60, and through the first slot 74 in the lower bracket bar 62. The open loop 32 defined by the pulley rod 30 is then closed by a section 110 of the threaded rod 16 that extends between the hook 36 and the upper bracket bar 60. This prevents the cable 18 from moving transversely out of the loop 32.

The upper bracket bar 60 is fixed to the pulley rod 30, and the lower bracket bar 62 is pivotal about the pulley rod 30. When the pulley 10 is being mounted on the threaded rod 16 in the closed position of FIG. 6, the lower bracket bar 62 is moved pivotally into engagement with the threaded rod 16 after the hook 36 and the upper bracket bar 60 have been engaged with the threaded rod 16. The hook 36 and the two bracket bars 60 and 62 securely block movement of the pulley 10 horizontally relative to the threaded rod 16. Further in accordance with this feature of the invention, the lower bracket bar 62 is preferably mounted loosely on the pulley rod 30 so that it can move pivotally toward and away from the upper bracket bar 60 through a small range of movement. This facilitates movement of the lower bracket bar 62 into engagement with the threaded rod 16.

When the pulley 10 is mounted on the threaded rod 16 in the open position 100 of FIG. 7, the threaded rod 16 is received in the second slots 66 and 76 in the bracket bars 60 and 62, which are spaced horizontally from the hook 36 at the upper end portion 34 of the pulley rod 30. The cable 18 can then be moved transversely into and out of the open loop 32 through a gap 120 defined between the threaded rod 16 and the hook 36.

As best shown in FIG. 7, the bracket structure 12 includes a pair of locking devices 130 and 132. The first locking device 130 secures the pulley 10 vertically on the threaded rod 16 in the closed position. The second locking device 132 secures the pulley 10 vertically on the threaded rod 16 in the open position.

Figure 8:
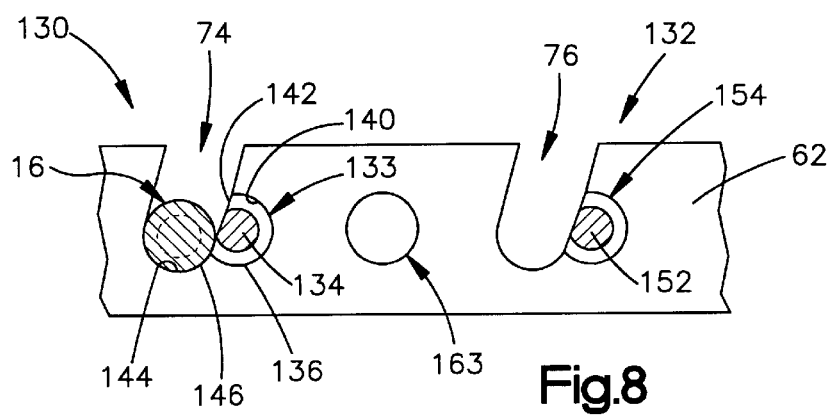
FIG. 8 is a top view of parts shown in FIG. 7.
Figure 9:
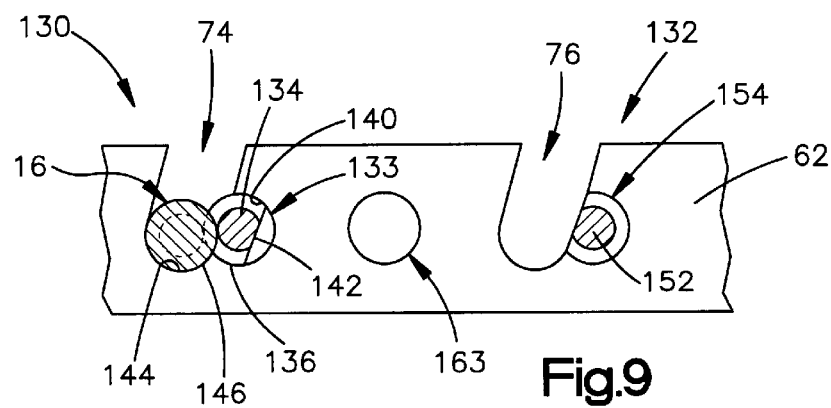
FIG. 9 is a view similar to FIG. 8 showing parts in different positions.
Figure 10:
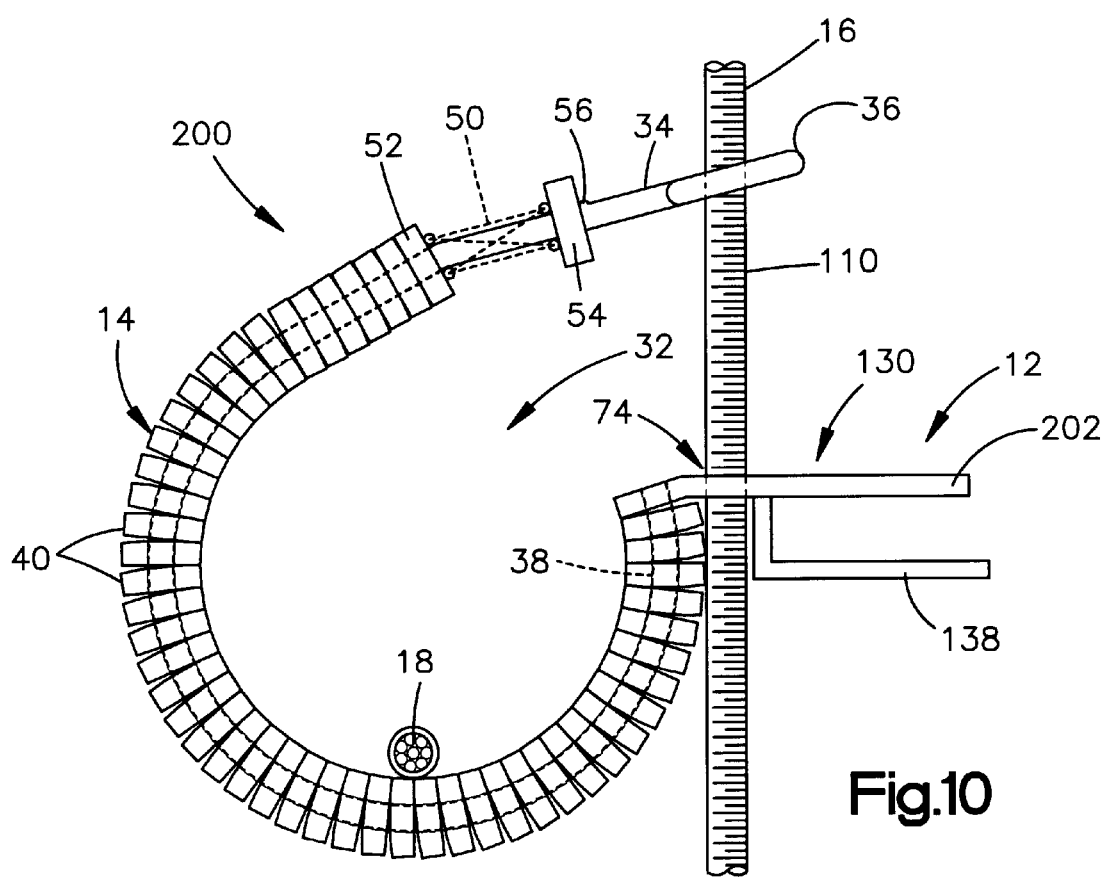
FIG. 10 is a view similar to FIG. 6 showing parts of a second embodiment of the invention.

As further shown in FIGS. 9 and 10, the first locking device 130 includes a screw-threaded bore 133 which extends through the lower bracket bar 62. The bore 133 adjoins the first slot 74 in the lower bracket bar 62, and is open to the first slot 74. A locking member 134 with a screw thread 136 is received in the bore 133. The locking member 134 is an end portion of a lever 138 (FIG. 7), and is rotatable within the bore 133 in meshing engagement with the screw thread 140 in the bore 133. A flat 142 is provided on the locking member 134. When the flat 142 faces the adjoining slot 74 in the lower bracket bar 62 (FIG. 8), the threaded rod 16 can be received in the slot 74, and can be moved fully into meshing engagement with a screw thread 144 at the inner end of the slot 74. (A similar screw thread is located at the inner end of the other slot 76.) The lever 136 can then rotate so as to move the screw thread 136 on the locking member 134 into meshing engagement with the screw thread 146 on the threaded rod 16, as shown in FIG. 9.

When the locking member 134 is in a locking position as shown in FIG. 9, the meshing screw threads 136 and 146 securely block movement of the bracket structure 12 vertically relative to the threaded rod 16 under the weight of the pulley 10, or under the influence of forces applied to the pulley 10 by one or more cables 18 extending through the loop 32. In accordance with a particular feature of the invention, the meshing screw threads 136 and 144 enable the entire pulley 10 to rotate about the threaded rod 16. This avoids stresses that would otherwise be induced in the locking member 134 by the forces applied to the pulley 10 by the moving cables 18.

Additionally, each screw thread 140 in the bores 133 and 154 is preferably slightly out of phase with the screw thread 144 in the adjoining slot 74 or 76. This provides a fit between the meshing screw threads 136 and 146 that is tighter than it would be if the screw threads 140 and 144 were not out of phase. The phase difference between the screw threads 140 and 144 is preferably within a specified range of up to about 2° to 3°.

Figure 3:
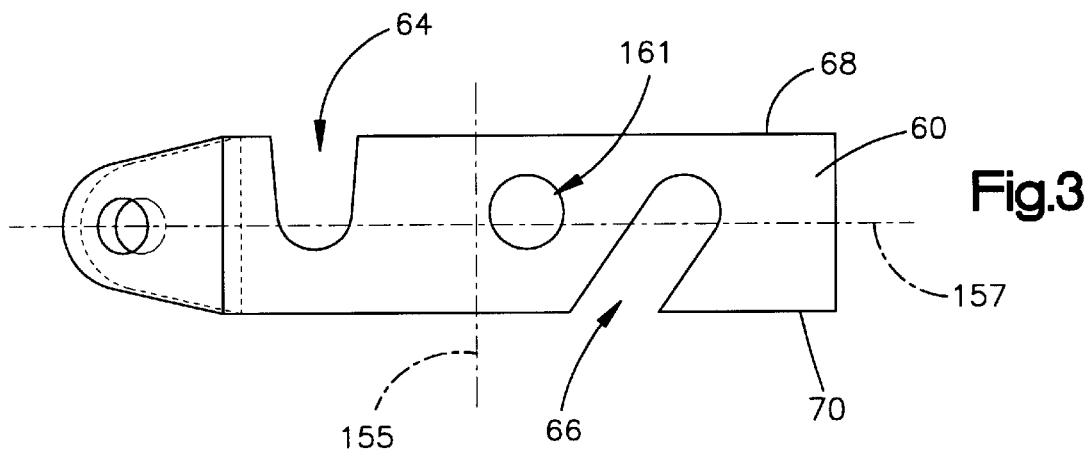
FIG. 3 is an enlarged top view of a part shown in FIG. 1.

The second locking device 132 similarly comprises a lever 150 with a screw threaded end portion 152 that rotates between locking and unlocking positions in a corresponding bore 154 in the same manner for mounting of the pulley 10 on the threaded rod 16 in the open position, as shown in FIG. 1. When the pulley 10 is mounted on the threaded rod 16 in the open position, the hook 36 at the upper end portion 34 of the pulley rod 30 does not engage the threaded rod 16 to block movement of the pulley 10 horizontally relative to the threaded rod 16. Therefore, as shown in FIG. 3, the second slot 66 in the upper bracket bar 60 is preferably open oppositely relative to the second slot 76 in the lower bracket bar 62. This provides a secure engagement of the bracket structure 12 with the threaded rod 16 by enabling the bracket structure 12 to engage the threaded rod 16 at diametrically opposite sides of the threaded rod 16. Without the oppositely directed orientation of the slots 66 and 76, the entire pulley 10 would be movable horizontally off the threaded rod 16 by moving the rod 16 out of both slots 66 and 76 in a single direction.

Figure 5:
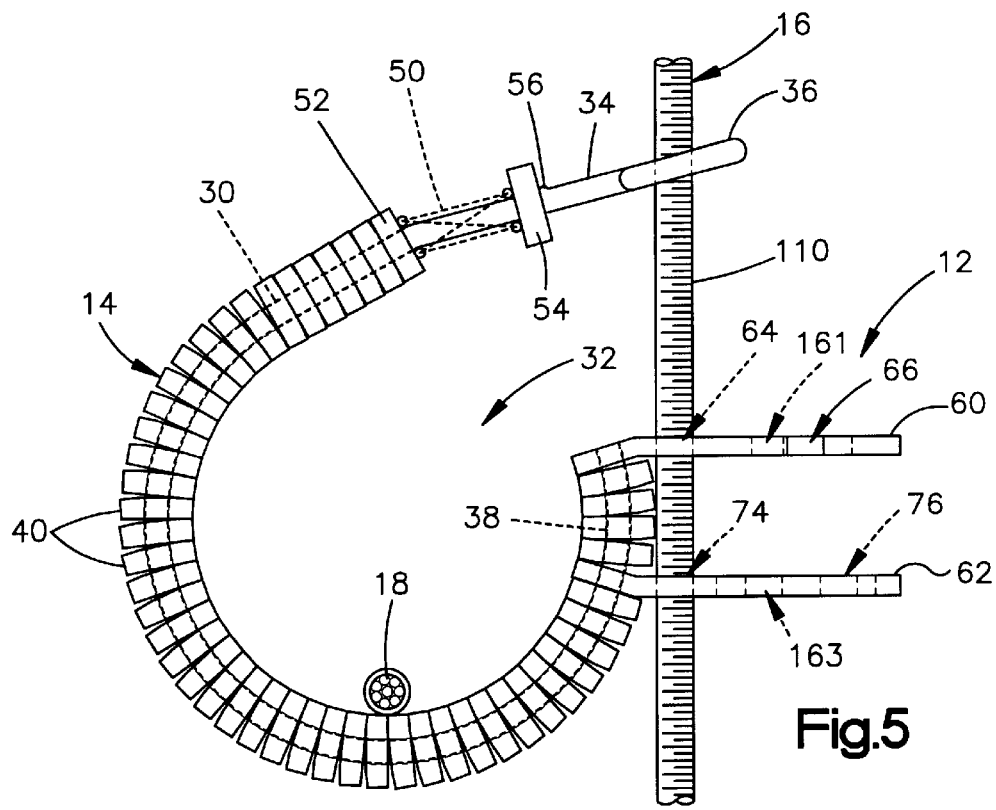
FIG. 5 is a partial view of the apparatus shown in FIG. 1.

In accordance with more particular features of the invention, the levers 138 and 150 are preferably long enough to reach the rollers 40 on the pulley 10 and 30. This blocks the levers 136 and 150 from rotating enough for the locking members 134 and 152 to be unscrewed from the lower bracket bar 62. In addition, a pair of vertically aligned apertures 161 and 163 (FIGS. 4 and 5) in the upper and lower bracket bars 60 and 62, which may have internal screw threads (not shown), are provided for receiving a bolt or other fastener for optional mounting of the pulley 10 on a rack 20 or a framing channel 24 in the overhead structure of FIG. 1. Additionally, the second slot 66 in the upper bracket bar 60 extends transversely inward of the upper bracket bar 60 at an angle from a transverse centerline 155 of the upper bracket bar 60. This helps to limit movement of the upper bracket bar 60 relative to the threaded rod 16 in a direction parallel to the longitudinal centerline 157 of the upper bracket bar 60.

A pulley 200 comprising a second embodiment of the invention is shown in FIG. 10. The pulley 200 has many parts that are substantially the same as corresponding parts of the pulley 10 described above. This is indicated by the use of the same reference numbers for such corresponding parts in FIGS. 1 and 10. However, the pulley 200 includes only a single bracket bar 202, and is configured to be mounted on the threaded rod 16 in only a closed position, as shown in FIG. 10.

The invention has been described with reference to preferred embodiments. Those skilled in the art will perceive improvements, changes and modifications, all of which are intended to be within the scope of the claims.

What is claimed is:

1. A pulley apparatus for guiding a cable over a framework structure suspended from a ceiling by a threaded rod, said pulley apparatus comprising:

a guide structure configured to guide the cable longitudinally through said pulley apparatus; and a bracket structure configured to engage the threaded rod so as to mount said guide structure on the threaded rod.

2. A pulley apparatus as defined in claim 1 wherein said guide structure includes a pulley rod in the shape of an open loop, with one end portion of said pulley rod being shaped as a hook to extend around the threaded rod when said guide structure is in said installed position.

3. A pulley apparatus as defined in claim 2 wherein said pulley rod has an opposite end portion and said bracket structure projects from said opposite end portion.

4. A pulley apparatus as defined in claim 3 wherein said bracket structure includes a bracket bar projecting longitudinally from said opposite end portion of said pulley rod.

5. A pulley apparatus as defined in claim 4 wherein said bracket bar has a transversely extending slot configured to receive the threaded rod when said guide structure is in said installed position.

6. A pulley apparatus as defined in claim 1 wherein said bracket structure is configured to mount said guide structure on the threaded rod in a first installed position in which a cable can be moved transversely into and out of said guide structure, and to mount said guide structure on the threaded rod in a second installed position in which the cable cannot be moved transversely into or out of said guide structure.

7. A pulley apparatus as defined in claim 6 wherein said bracket structure includes a pair of vertically spaced-apart bracket bars, with said bracket bars having a first pair of vertically aligned slots configured to receive the threaded rod when said guide structure is in said first installed position, and further having a second pair of vertically aligned slots configured to receive the threaded rod when said guide structure is in said second installed position.

8. A pulley apparatus as defined in claim 7 wherein one of said bracket bars has a first slot open at a first side edge and a second slot open at an opposite side edge.

9. A pulley apparatus as defined in claim 1 wherein said bracket structure includes a locking member having a screw thread which is movable into meshing engagement with the threaded rod to lock said guide structure vertically onto the threaded rod.

10. A pulley apparatus as defined in claim 9 wherein said bracket structure includes a bracket bar which has a slot configured to receive the threaded rod, and which further has a screw threaded bore adjoining said slot, with said locking member being rotatable in said bore so as to move into and out of meshing engagement with the threaded rod in said slot.

11. A pulley apparatus as defined in claim 10 wherein said locking member has a flat which interrupts said screw thread on said locking member, and is rotatable into and out of a position in which said flat faces said slot to provide clearance for the threaded rod to move into and out of said slot.

12. A pulley apparatus as defined in claim 11 wherein said locking member is an end portion of a lever which is rotatable relative to said bracket bar.

13. A pulley apparatus as defined in claim 1 wherein said guide structure includes independently rotatable rollers, with each roller being shaped as a disk with a cylindrical peripheral surface, a flat side surface, and a frusto-conical side surface.

14. A pulley apparatus as defined in claim 13 wherein the frusto-conical side surface of each roller faces the flat side surface of an adjacent roller.

15. A pulley apparatus as defined in claim 14 wherein said rollers are pressed together under the bias of a spring.

\* \* \* \* \*